US009108715B2

(12) United States Patent
Kordel et al.

(10) Patent No.: US 9,108,715 B2
(45) Date of Patent: Aug. 18, 2015

(54) ROTARY ACTUATED HIGH LIFT GAPPED AILERON

(75) Inventors: Jan A. Kordel, Redmond, WA (US); Seiya Sakurai, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 365 days.

(21) Appl. No.: 13/482,537

(22) Filed: May 29, 2012

(65) Prior Publication Data

US 2013/0320151 A1 Dec. 5, 2013

(51) Int. Cl.
*B64C 3/50* (2006.01)
*B64C 1/10* (2006.01)

(52) U.S. Cl.
CPC .................................... *B64C 1/10* (2013.01)

(58) Field of Classification Search
CPC ...................................................... B64C 9/16
USPC ......... 244/198, 204, 211, 213, 212, 214, 215, 244/216, 217, 210, 99.9, 99.1, 99.2
See application file for complete search history.

(56) References Cited

U.S. PATENT DOCUMENTS 2,920,844 A * 1/1960 Marshall et al. .............. 244/207
3,583,660 A * 6/1971 Hurkamp et al. .............. 244/207
3,767,140 A * 10/1973 Johnson ........................ 244/216
3,874,617 A * 4/1975 Johnson ........................ 244/216
3,921,942 A 11/1975 Bracka
4,015,787 A * 4/1977 Maieli et al. .................. 244/215
4,120,470 A * 10/1978 Whitener ...................... 244/213
4,720,066 A * 1/1988 Renken et al. ................ 244/213
5,094,412 A * 3/1992 Narramore .................... 244/214
5,207,400 A * 5/1993 Jennings ....................... 244/216
5,566,910 A 10/1996 Diekmann et al.
5,735,485 A * 4/1998 Ciprian et al. ................ 244/113
7,243,881 B2 * 7/2007 Sakurai et al. ................ 244/212
7,891,611 B2 * 2/2011 Huynh et al. ................. 244/215
2005/0011994 A1 * 1/2005 Sakurai et al. ................ 244/212
2005/0061922 A1 * 3/2005 Milliere ........................ 244/213

FOREIGN PATENT DOCUMENTS

GB 2 003 098 A 3/1979
GB 2 096 551 A 10/1982
SE WO97/32779 * 9/1997 ................ B64C 9/20
WO WO 91/05699 A1 5/1991
WO WO 2010/052022 A2 5/1991
WO WO 97/32779 A1 9/1997

OTHER PUBLICATIONS

EP13167354.3 Extended European Search Report of European Patent Office, Oct. 10, 2013.
EP13167354.5 Extended European Search Report of European Patent Office, Oct. 10, 2013.

* cited by examiner

*Primary Examiner* — Isam Alsomiri
*Assistant Examiner* — Justin Benedik
(74) *Attorney, Agent, or Firm* — Ameh IP; Elahe Toosi; Lowell Campbell

(57) ABSTRACT

A rotary actuated high lift gapped aileron system and method are presented. A high lift gapped aileron couples to an airfoil at a hinge line and changes a camber of the airfoil. A rotary actuator coupled to the high lift gapped aileron produces a rotary motion of the high lift gapped aileron in response to an actuation command. A droop panel positioned over the hinge line enhances lift of the high lift gapped aileron. A cove lip door positioned under the hinge line provides an airflow over the high lift gapped aileron. A deployment linkage mechanism coupled to the high lift gapped aileron positions the droop panel and the cove lip door in response to the rotary motion.

20 Claims, 9 Drawing Sheets

ROTARY ACTUATED HIGH LIFT GAPPED AILERON

FIELD

Embodiments of the present disclosure relate generally to fluid-dynamic design. More particularly, embodiments of the present disclosure relate to design of fluid-dynamic control surfaces.

BACKGROUND

Ailerons are generally hinged flight control surfaces attached to a trailing edge of a wing of a fixed-wing aircraft. The ailerons are used to control the aircraft in roll, which results in a change in heading due to tilting of a lift vector. Current wing trailing edge configurations provide high lift through single slot flaps with drooping spoilers to exhibit trailing edge variable camber (TEVC) functionality. In order to provide higher cruise performance, wing aspect ratios are being driven higher. High wing aspect ratios result in very long outboard flap spans generally requiring one or two heavy and expensive outboard flaps with a large number of spoilers.

SUMMARY

A rotary actuated high lift gapped aileron system and method are presented. A high lift gapped aileron couples to an airfoil at a hinge line and changes a camber of the airfoil. A rotary actuator coupled to the high lift gapped aileron produces a rotary motion of the high lift gapped aileron in response to an actuation command. A droop panel positioned over the hinge line enhances lift of the high lift gapped aileron and a cove lip door positioned under the hinge line provides an airflow over the high lift gapped aileron. A deployment linkage mechanism coupled to the high lift gapped aileron positions the droop panel and the cove lip door in response to the rotary motion.

In this manner, embodiments of the discloser provide high lift functionality to the gapped aileron, thereby reducing outboard flap span and simplifying the flap as well as reducing a number of spoilers by virtue of actuator type, actuator placement and bladed fitting geometry of the gapped aileron.

In an embodiment, a rotary actuated high lift gapped aileron system comprises a high lift gapped aileron, a droop panel, a cove lip door, a rotary actuator, and a deployment linkage mechanism. The high lift gapped aileron couples to an airfoil at a hinge line and changes a camber of the airfoil. The rotary actuator is coupled to the high lift gapped aileron and produces a rotary motion of the high lift gapped aileron in response to an actuation command. The droop panel is positioned over the hinge line and enhances lift of the high lift gapped aileron. The cove lip door is positioned under the hinge line and provides an airflow over the high lift gapped aileron. The deployment linkage mechanism is coupled to the high lift gapped aileron and positions the droop panel and the cove lip door in response to the rotary motion.

In another embodiment, a method for providing lift on a fluid-dynamic body couples a rotary actuated high lift gapped aileron to the fluid-dynamic body at a hinge line. The method further positions a rotary actuator at an end of the rotary actuated high lift gapped aileron. The method further configures the rotary actuated high lift gapped aileron to change a camber of the fluid-dynamic body when deployed in response to a rotary actuation of the rotary actuator.

In a further embodiment, a rotary actuated high lift gapped aileron deployment linkage mechanism comprises a rotary actuator, a cove lip door linkage, and a droop panel linkage. The rotary actuator couples to and moves a rotary actuated high lift gapped aileron. The cove lip door linkage is coupled to the rotary actuated high lift gapped aileron and a cove lip door, and rotates the cove lip door in response to a rotary actuation of the rotary actuator. The droop panel linkage is coupled to the rotary actuated high lift gapped aileron and a droop panel and moves the droop panel in response to the rotary actuation.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to fluid-dynamics, hydrofoils, airfoils, rotary actuators, vehicle structures, control systems, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, a gapped aircraft aileron. Embodiments of the disclosure, however, are not limited to such aircraft aileron applications, and the techniques described herein may also be utilized in other applications. For example but without limitation, embodiments may be applicable to hydrofoils, wind turbines, tidal power turbines, or other fluid-dynamic surface.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
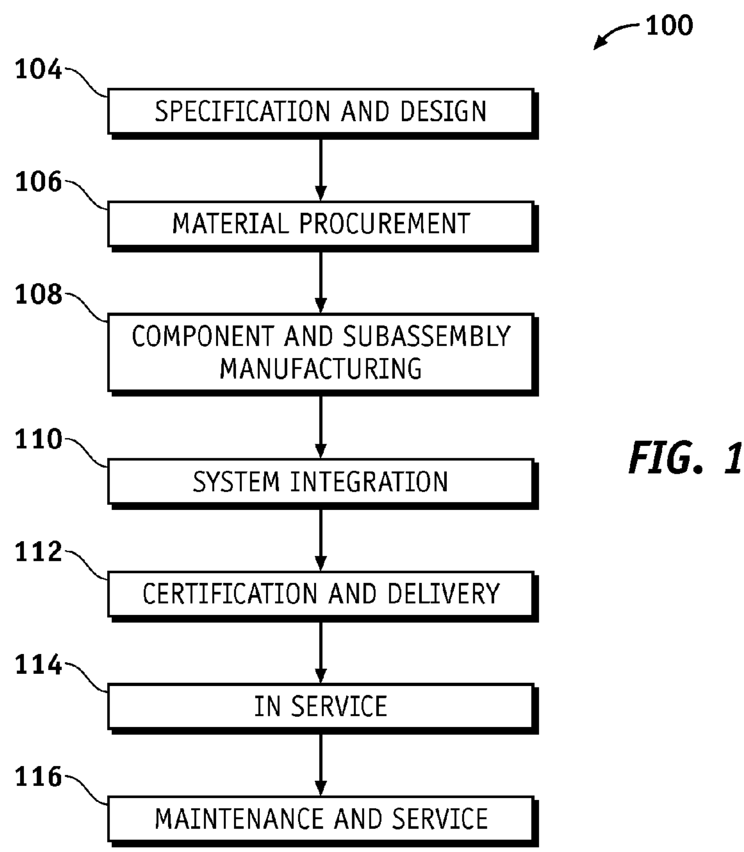
FIG. 1 is an illustration of a flow diagram of an exemplary aircraft production and service methodology.
Figure 2:
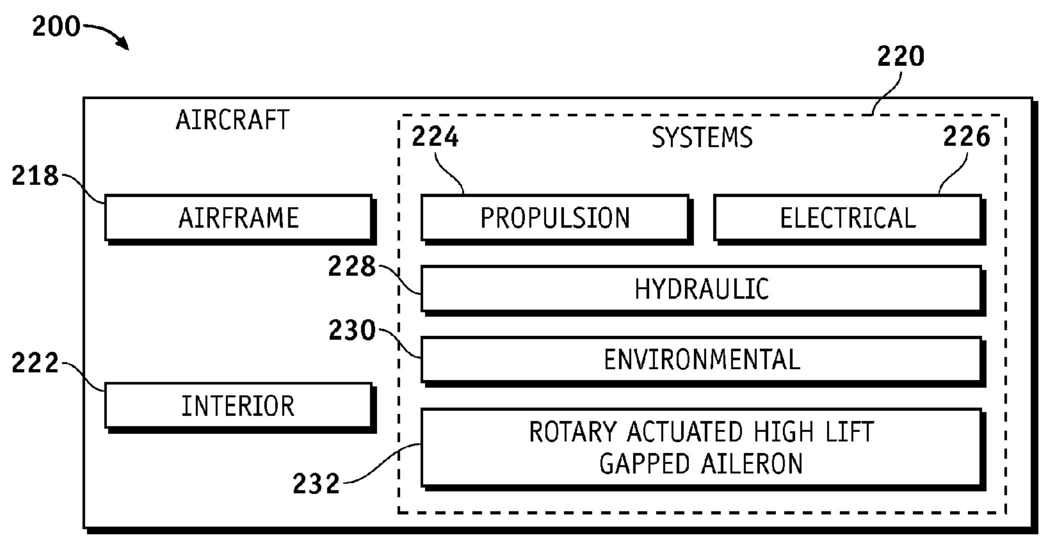
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 1, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental system 230, and a rotary actuated high lift gapped aileron system 232. Any number of other systems may also be included. Although an aerospace example is shown, the embodiments of the disclosure may be applied to other industries.

Apparatus and methods embodied herein may be employed during any one or more of the stages of the method 100. For example, components or subassemblies corresponding to production of the process 108 may be fabricated or manufactured in a manner similar to components or subassemblies produced while the aircraft 200 is in service. In addition, one or more apparatus embodiments, method embodiments, or a combination thereof may be utilized during production stages of the process 108 and the system integration 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Conventionally actuated gapped ailerons have difficulty providing high lift due to slot blockage and excessive fairing size. A conventionally actuated gapped aileron generally provides a gap on a low speed gapped aileron by placing a hinge line low relative to a wing/fluid-dynamic surface, which results in excessive fairing size of a lower surface fairing causing slot blockage contributing to aerodynamic drag.

Embodiments of the disclosure provide high lift and low drag by: 1) Use of a rotary actuator that allows a hinge line to be high up and inside of a lower surface of a trailing edge cove of a gapped aileron, which results in no fairings; 2) Actuator placement that keeps the gapped aileron relatively short allowing the gapped aileron to be end mounted with rotary actuators allowing free flow of fluid across a span of the aileron with substantially no low speed blockage; and 3) Bladed fitting geometry allows a leading edge of the gapped aileron to be deployed low enough into an air/fluid stream to be a high lift device despite a high hinge line.

Figure 3:
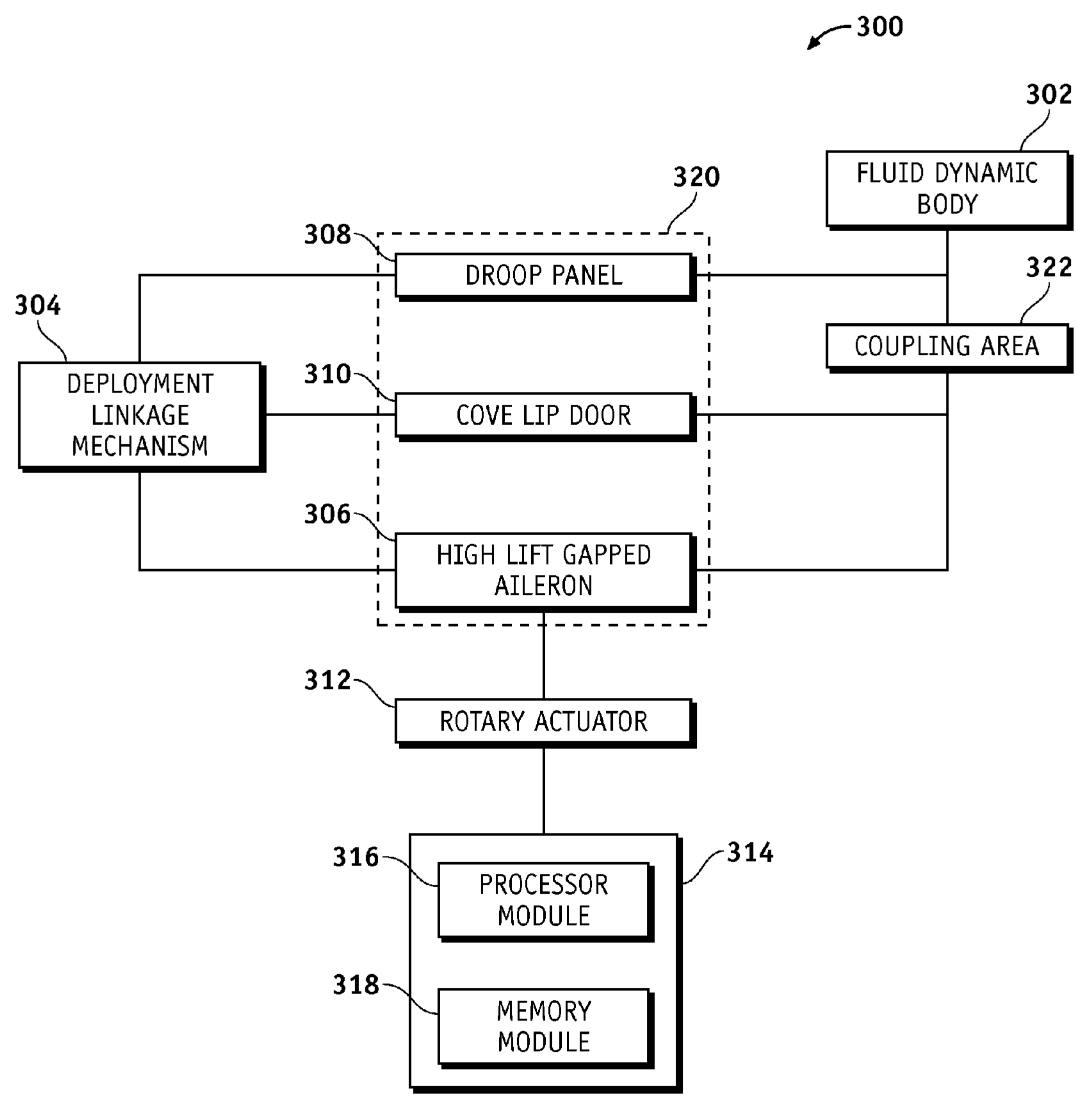
FIG. 3 is an illustration of an exemplary block diagram of a rotary actuated high lift gapped aileron system according to an embodiment of the disclosure.

FIG. 3 is an illustration of an exemplary block diagram of a rotary actuated high lift gapped aileron system 300 (system 300) according to an embodiment of the disclosure. The system 300 may comprise, a fluid-dynamic body 302 (airfoil 302), a rotary actuated high lift gapped aileron deployment linkage mechanism 304 (deployment linkage mechanism 304), a high lift gapped aileron 306, a droop panel 308, a cove lip door 310, a rotary actuator 312, and a controller 314.

The fluid-dynamic body 302 is coupled to the high lift gapped aileron 306, and may comprise a lifting surface and/or a control surface. The lifting surface may comprise, for example but without limitation, a wing, a canard, a horizontal stabilizer, or other lifting surface. The control surface may comprise, for example but without limitation, a slat, an elevator, a flap, a spoiler, an elevon, or other control surface. As mentioned above, embodiments may be applicable to hydrofoils, wind turbines, tidal power turbines, or other fluid-dynamic surface. Thus an aerodynamic body and a fluid-dynamic body may be used interchangeably in this document.

The deployment linkage mechanism 304 is operable to vary a shape of a camber 416 (curvature) (FIG. 4) of the fluid-dynamic body 302 (airfoil 302) by moving/extending/rotating/deflecting the high lift gapped aileron 306 in response to a rotary actuation command (rotary actuation) from the rotary actuator 312. As shown at a cross section 414 of a wing 402 in FIG. 4, the camber 416 may be defined by a chord line 422 and a camber line 424. The camber 416 may comprise an asymmetry between an upper surface 426 of the airfoil 302 and a lower surface 428 of the airfoil 302. The high lift gapped aileron 306 is configured to change the camber 416 of the airfoil 302 to alter a flow of air/fluid stream 412 (FIG. 4) over the fluid-dynamic body 302. The deployment linkage mechanism 304 according to various embodiments is discussed in more detail below in the context of discussion of FIGS. 5-8.

Figure 4:
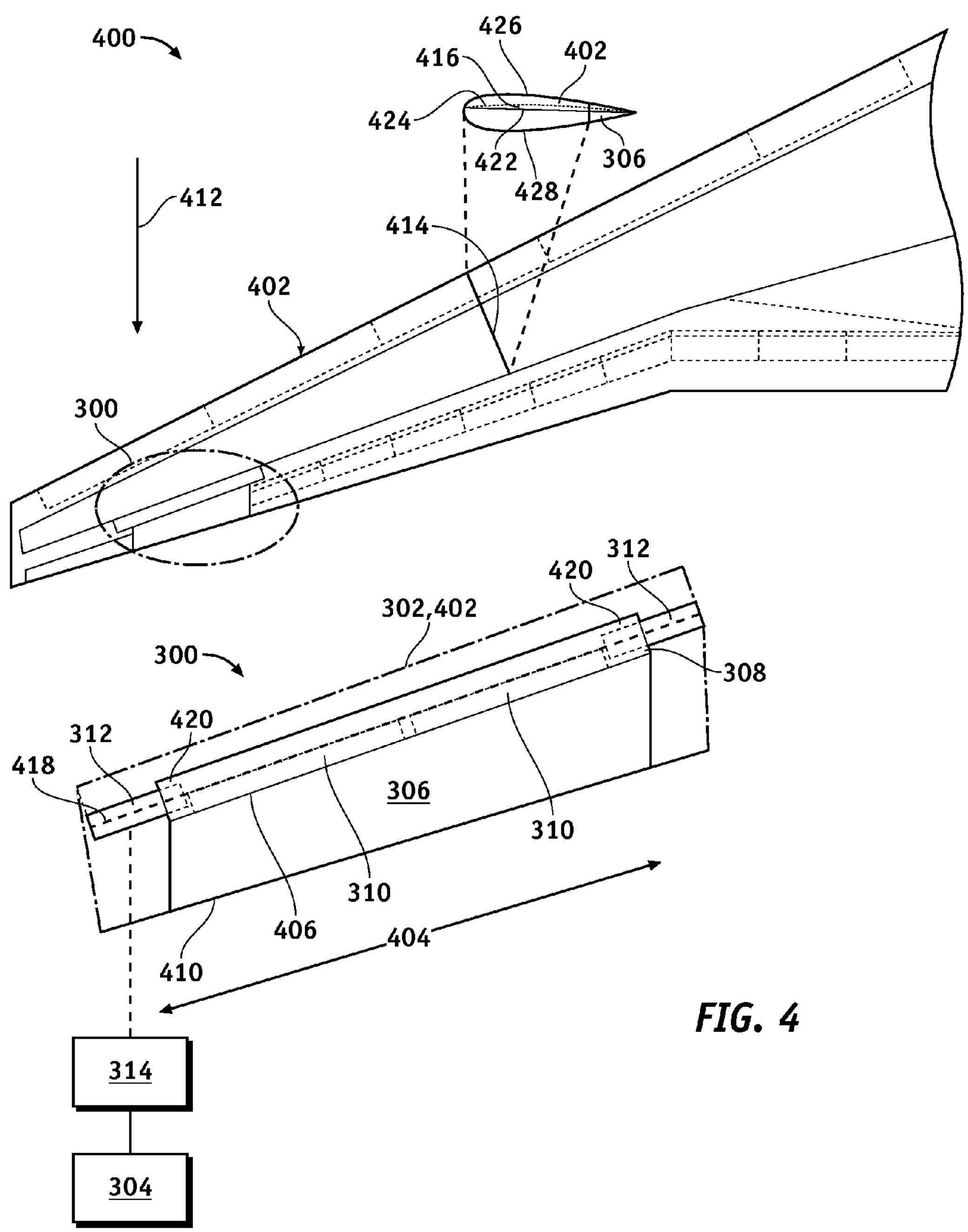
FIG. 4 is an illustration of an exemplary perspective view of a wing comprising a rotary actuated high lift gapped aileron system according to an embodiment of the disclosure.
Figure 5:
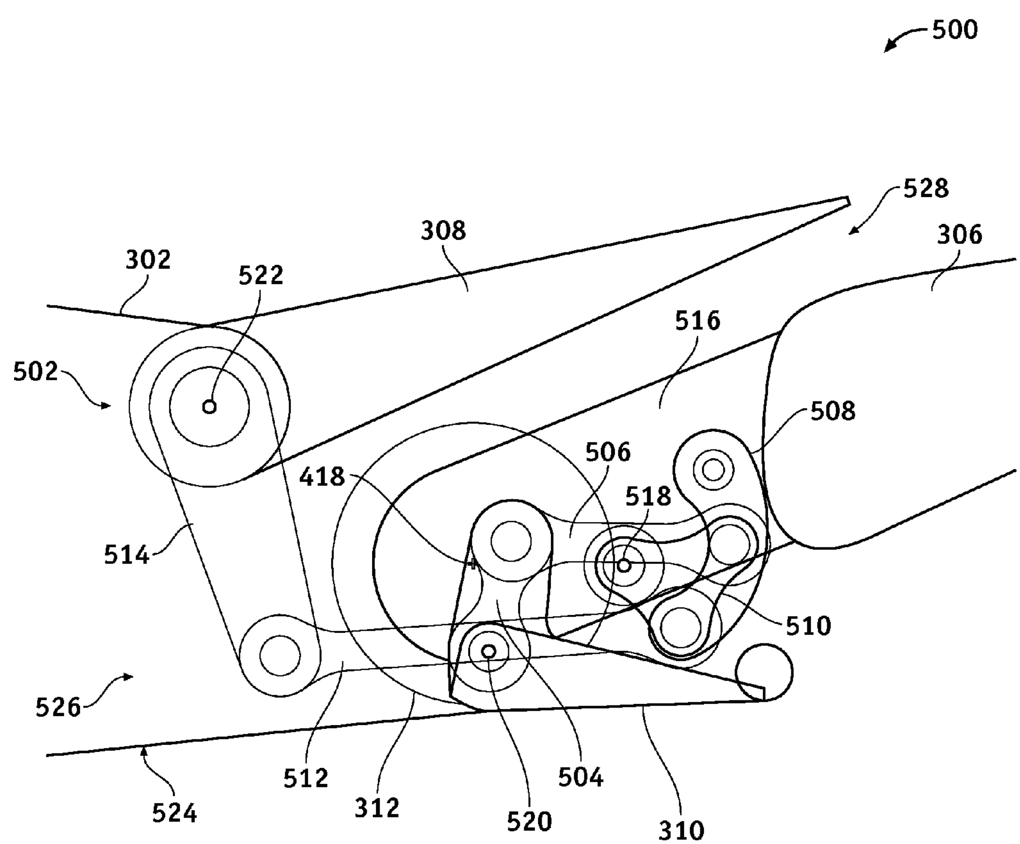
FIG. 5 is an illustration of an exemplary cross sectional view of a rotary actuated high lift gapped aileron system showing a deployment linkage mechanism in a roll maneuver position according to an embodiment of the disclosure.

The high lift gapped aileron 306 is coupled to the fluid-dynamic body 302 by the rotary actuator 312 and/or additional hinging means. A coupling area 322 such as the high hinge line 418 (FIG. 4) of the high lift gapped aileron 306 couples the fluid-dynamic body 302 to the high lift gapped aileron 306. The high lift gapped aileron 306 changes a camber such as the camber 416 of the airfoil 302 when the high lift gapped aileron 306 is deployed by the deployment linkage mechanism 304. The high hinge line 418 is positioned high inside a lower surface 524 of a trailing edge cove 526 (FIG. 5). The high lift gapped aileron 306 comprises a bladed fitting arm 516 (FIG. 5) which allows a leading edge 406 (see FIGS. 4 and 7) of the high lift gapped aileron 306 to be deployed low enough into an air/fluid stream 412 to be a high lift device despite the high hinge line 418 (FIG. 4). Positioning the high hinge line 418 high inside the lower surface 524 of the trailing edge cove 526 alleviates requirement for a fairing. This is in contrast to conventionally actuated gapped ailerons which have compromised lift due to drag and slot blockage associated with fairing sizing.

Slot blockage is generally an obstruction of a fairing or mechanism, which blocks or slows down airflow from a lower surface 524 (FIG. 5) of the wing 402 over a leading edge of a gapped aileron. In contrast, for embodiments of the disclosure there is minimal slot blockage in the system 300 described herein because the rotary actuator 312 and the deployment linkage mechanism 304 are located on the end area 420 of the high lift gapped aileron 306 allowing substantially clean airflow across a majority of a surface of the high lift gapped aileron 306.

End mounting the high lift gapped aileron 306 allows free flow of fluid across a span 404 (FIG. 4) of the high lift gapped aileron 306 which significantly alleviates low speed slot blockage. This is in contrast to conventionally actuated gapped ailerons which are limited in providing high lift due to slot blockage.

Furthermore, the high lift gapped aileron 306, the droop panel 308 and the cove lip door 310 form an assembly 320 configured to deploy by the deployment linkage mechanism 304 as explained below.

The droop panel 308 is placed over the high hinge line 418 of the high lift gapped aileron 306 with the fluid-dynamic body 302 and is configured to enhance a high lift effect of the high lift gapped aileron 306.

The cove lip door 310 is placed under the high hinge line 418 of the high lift gapped aileron 306 and is configured to provide a greater airflow over the high lift gapped aileron 306. The cove lip door 310 is coupled to the fluid-dynamic body 302 by a cove lip door hinge 520 (FIG. 5) and rotates about the cove lip door hinge 520.

The rotary actuator 312 is configured to produce a rotary motion or torque in response to a rotary actuation command. Use of the rotary actuator 312 allows the high hinge line 418 (FIG. 4) to be high inside of the lower surface 524 of a trailing edge cove 526 (FIG. 5). As mentioned above, positioning the high hinge line 418 high inside a lower surface 524 of a trailing edge cove 526 (FIG. 5) alleviates requirement for a fairing. This is in contrast to conventionally actuated gapped ailerons which are difficult to provide high lift due to slot blockage. The rotary actuator 312 may comprise, for example but without limitation, a rotary vane actuator, or other rotary actuator capable of producing a rotary motion.

Keeping the high lift gapped aileron 306 relatively short allows the high lift gapped aileron 306 to be end mounted at an end area 420 (FIG. 4) with the rotary actuators 312. As mentioned above, end mounting the high lift gapped aileron 306 allows free flow of fluid across the span 404 of the high lift gapped aileron 306 which alleviates a significant low speed slot blockage across the span 404 of the aileron high lift gapped aileron 306. This is in contrast to conventionally actuated gapped ailerons which are limited in providing high lift due to slot blockage.

The controller 314 may comprise, for example but without limitation, a processor module 316, or other module. The controller 314 may be implemented as, for example but without limitation, a part of an aircraft system, a centralized aircraft processor, a subsystem computing module comprising hardware and/or software devoted to the system 300, or other processor.

The controller 314 is configured to control the high lift gapped aileron 306 and the deployment linkage mechanism 304 to vary a shape of the camber 416 of the airfoil 302 by moving/extending/rotating/deflecting the high lift gapped aileron 306 in response to a rotary actuation command to the rotary actuator 312 according to various operation conditions. The operation conditions may comprise, for example but without limitation, flight conditions, ground operations, or other condition. The flight conditions may comprise, for example but without limitation, take off, maneuver cruise, approach, landing, or other flight condition. The ground operations may comprise, for example but without limitation, air breaking after landing, or other ground operation. The controller 314 may be located remotely from the high lift gapped aileron 306, or may be coupled to the high lift gapped aileron 306. In an embodiment, the controller 314 may include or be realized as a controller connected to the aircraft systems to facilitate controlling a change in the shape of the camber 416 by an actuation of the high lift gapped aileron 306 via the rotary actuator 312.

In operation, the controller 314 may control the high lift gapped aileron 306 by sending rotary actuation commands to the rotary actuator 312 to move the high lift gapped aileron 306, thereby moving/extending/rotating the high lift gapped aileron 306 in response to the rotary actuation command as explained in more detail below in the context of discussion of FIG. 5.

The processor module 316 comprises processing logic that is configured to carry out the functions, techniques, and processing tasks associated with the operation of the system 300. In particular, the processing logic is configured to support the system 300 described herein. For example, the processor module 316 may direct the high lift gapped aileron 306 to vary a shape of the camber 416 of the fluid-dynamic body 302 by moving the high lift gapped aileron 306 based on various flight conditions.

The processor module 316 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices comprising hardware and/or software, e.g., a combination of a digital signal processor and a microprocessor, a plurality of microprocessors, one or more microprocessors in conjunction with a digital signal processor core, or any other such configuration.

The memory module 318 may comprise a data storage area with memory formatted to support the operation of the system 300. The memory module 318 is configured to store, maintain, and provide data as needed to support the functionality of the system 300. For example, the memory module 318 may store flight configuration data, or other data.

In practical embodiments, the memory module 318 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 318 may be coupled to the processor module 316 and configured to store, for example but without limitation, a database, and the like. Additionally, the memory module 318 may represent a dynamically updating database containing a table for updating the database, or other application. The memory module 318 may also store, a computer program that is executed by the processor module 316, an operating system, an application program, tentative data used in executing a program, or other application.

The memory module 318 may be coupled to the processor module 316 such that the processor module 316 can read information from and write information to the memory module 318. For example, the processor module 316 may access the memory module 318 to access an aircraft speed, a flight control surface position such as a position of the high lift gapped aileron 306, an angle of attack, a Mach number, an altitude, or other data.

As an example, the processor module 316 and memory module 318 may reside in respective application specific integrated circuits (ASICs). The memory module 318 may also be integrated into the processor module 316. In an embodiment, the memory module 318 may comprise a cache memory for storing temporary variables or other intermediate information during execution of instructions to be executed by the processor module 316.

FIG. 4 is an illustration of an exemplary top view 400 of a wing 402 showing the rotary actuated high lift gapped aileron system 300 (system 300 in FIG. 3) in more detail according to an embodiment of the disclosure. The system 300 comprises the wing 402 as an example of the fluid-dynamic body 302, the deployment linkage mechanism 304, the high lift gapped aileron 306, the droop panel 308, the cove lip door 310, the rotary actuator 312, and the controller 314. FIG. 4 may have functions, material, and structures that are similar to the embodiments shown in FIG. 3. Therefore common features, functions, and elements may not be redundantly described here.

As mentioned above, the rotary actuator 312 is configured to produce a rotary motion or torque. The rotary actuator 312 allows the high hinge line 418 to be high inside of the lower surface 524 (FIG. 5) of the trailing edge cove 526 (FIG. 4). Positioning the high hinge line 418 high inside the lower surface 524 of the trailing edge cove 526 alleviates requirement for a fairing. This is in contrast to conventionally actuated ailerons which are limited in providing high lift due to fairing sizing.

Furthermore, the rotary actuator 312 is placed so as to keep the high lift gapped aileron 306 relatively short. As mentioned above, keeping the high lift gapped aileron 306 relatively short allows the high lift gapped aileron 306 to be end mounted at the end area 420 with the rotary actuators 312. End mounting the high lift gapped aileron 306 allows free flow of fluid across the span 404 of the high lift gapped aileron 306 which alleviates a significant low speed slot blockage across the span 404 of the aileron high lift gapped aileron 306. This is in contrast to conventionally actuated gapped ailerons which are limited in providing high lift due to slot blockage.

The high lift gapped aileron 306 in response to the rotary actuation of the rotary actuator 312 enables an air/fluid stream 708 to flow from a lower part 706 (FIG. 7) of the wing 402/aerodynamic body 302 over the leading edge 406 of the high lift gapped aileron 306 via a slot 528 (FIG. 5) when the high lift gapped aileron 306 is deflected with a trailing edge 410 down. The high lift gapped aileron 306 comprises a bladed fitting arm 516 (FIG. 5) coupling the high lift gapped aileron 306 to the rotary actuator 312.

The cove lip door 310 is placed under the high hinge line 418 of the high lift gapped aileron 306 with the wing 402 and is configured to provide a greater airflow.

The droop panel 308 is placed over the high hinge line 418 of the high lift gapped aileron 306 with the wing 402 and is configured to enhance a high lift effect of the high lift gapped aileron 306.

In practice, the rotary actuated high lift gapped aileron 306 on the wing 402 enables the air/fluid stream 708 to flow from the lower part 706 (FIG. 7) of the wing 402 over the leading edge 406 of the rotary actuated high lift gapped aileron 306 via the slot 528 with the rotary actuated high lift gapped aileron 306 trailing edge 410 deflected down. The cove lip door 310 provides greater fluid flow, and the droop panel 308 enhances an associated high lift effect of the rotary actuated high lift gapped aileron 306. Furthermore, positioning the high hinge line 418 inside the lower surface 524 of the trailing edge cove 526 alleviates a need for a fairing, and positioning the rotary actuator 312 at the end area 420 of the rotary actuated high lift gapped aileron 306 alleviates a significant slot blockage across the span 404.

FIG. 5 is an illustration of an exemplary cross sectional view 500 of the rotary actuated high lift gapped aileron system 300 showing a deployment linkage mechanism 502 in a roll maneuver position according to an embodiment of the disclosure. The deployment linkage mechanism 502 is coupled to the rotary actuated high lift gapped aileron 306 and the aerodynamic body 302.

The assembly 320 (FIG. 3) may be deployed through a plurality of positions by the deployment linkage mechanism 502 (304 in FIG. 3) coupled to the aerodynamic body 302. The positions may begin by positioning the high lift gapped aileron 306 at a stowed/cruise position 604 (shown in FIG. 6), and move through intermediate positions to a deployed position. The deployed position may comprise positioning the high lift gapped aileron at, for example but without limitation, a landing position 704 (shown in FIG. 7), a take-off position 804 (shown in FIG. 8), or other deployed position. The deployment linkage mechanism 502 may comprise a cove lip door linkage 506 and a droop panel linkage 512.

The cove lip door linkage 506 is coupled to a cove lip door arm 504, a rotation plate 510, and to the bladed fitting arm 516 via a linkage 508. The cove lip door arm 504 is coupled to the cove lip door 310, and the rotary actuator 312. The cove lip door arm 504 is configured to rotate the cove lip door 310 in response to a rotation of the rotation plate 510.

The cove lip door linkage 506 is coupled to the bladed fitting arm 516 and the rotation plate 510 and is configured to rotate/move/extend/deflect the high lift gapped aileron 306 in response to the rotary actuation by the rotary actuator 312. The rotation plate 510 is coupled to the aerodynamic body 302 by a hinge 518. The bladed fitting arm 516 couples the high lift gapped aileron 306 to the rotary actuator 312.

The droop panel linkage 512 is coupled to the rotation plate 510, the rotary actuator 312 and a droop panel arm 514 and is configured to rotate/move/extend/deflect the droop panel 308 via the droop panel arm 514 in response to the rotary actuation by the rotary actuator 312.

Figure 6:
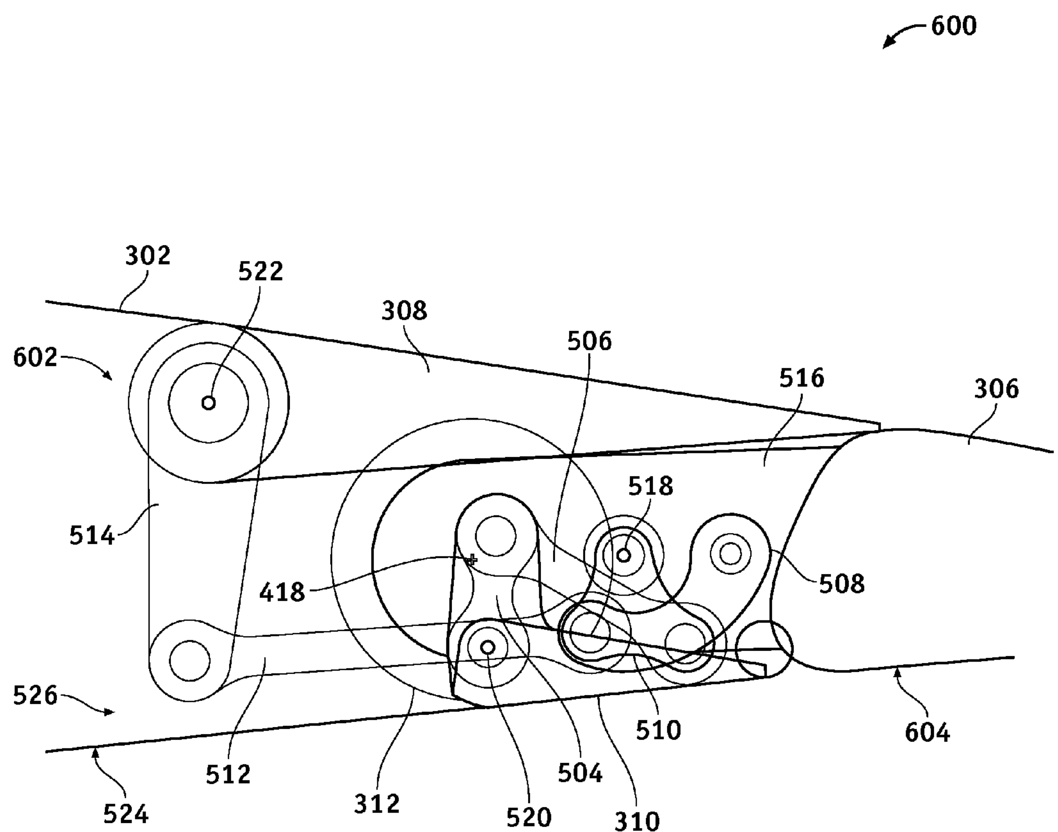
FIG. 6 is an illustration of an exemplary cross sectional view of a rotary actuated high lift gapped aileron system showing a deployment linkage mechanism in a cruise position according to an embodiment of the disclosure.

FIG. 6 is an illustration of an exemplary cross sectional view 600 of the rotary actuated high lift gapped aileron system 300 showing the deployment linkage mechanism 304 in a cruise configuration 602 with the high lift gapped aileron 306 in the cruise position 604 according to an embodiment of the disclosure. In the cruise position 604, the assembly 320 (FIG. 3) is stowed to provide a low aerodynamic drag condition during cruise. As mentioned above, by positioning the rotary actuator 312 at the end area 420 of the high lift gapped aileron 306, there is very limited slot blockage across the span 404 of the high lift gapped aileron 306. These features contribute to provide the high lift gapped aileron 306 that has less cruise drag than a conventional linear actuated aileron and also with the benefit of providing very efficient high lift.

Figure 7:
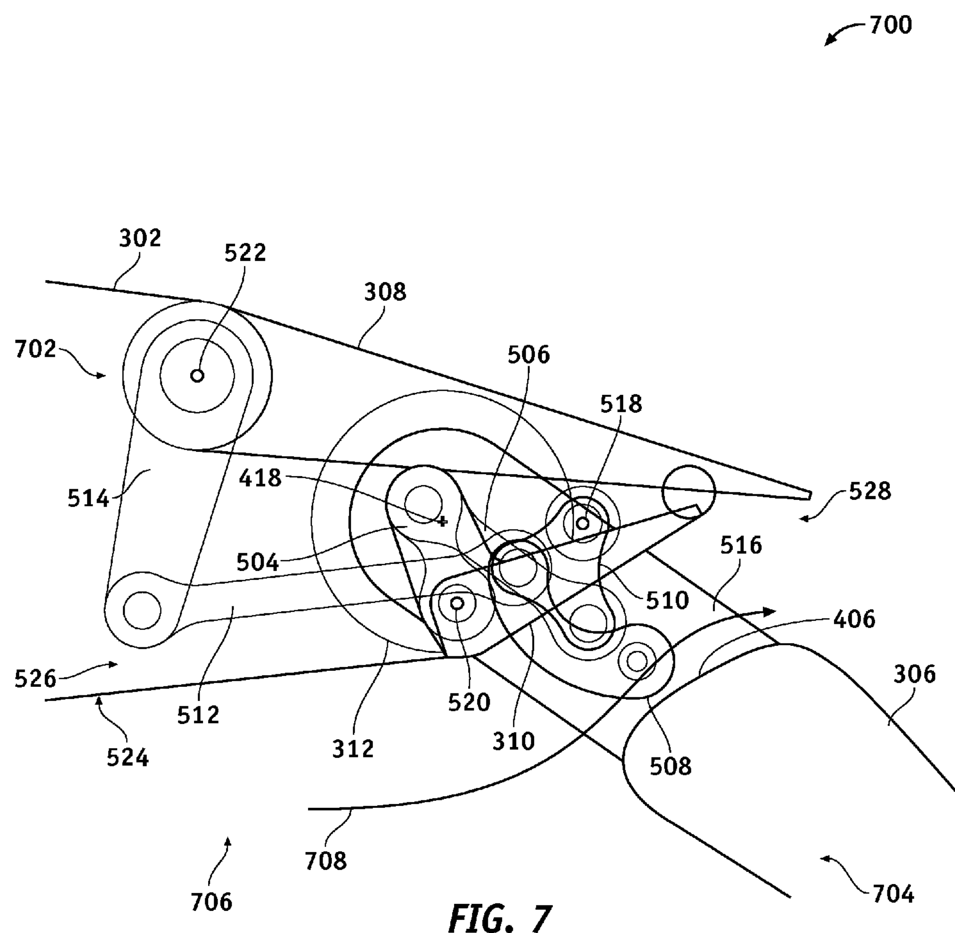
FIG. 7 is an illustration of an exemplary cross sectional view of a rotary actuated high lift gapped aileron system showing a deployment linkage mechanism in a landing position according to an embodiment of the disclosure.

FIG. 7 is an illustration of an exemplary cross sectional view 700 of the rotary actuated high lift gapped aileron system 300 showing the deployment linkage mechanism 304 in a landing configuration 702 with the high lift gapped aileron 306 in the landing position 704 according to an embodiment of the disclosure. The assembly 320 (FIG. 3) is positioned lower relative to the aerodynamic body 302 to increase an amount of lift generated, and to increase drag which can be beneficial during approach and landing because it slows the aircraft. As mentioned above, the high lift gapped aileron 306 enables the air/fluid stream 708 to flow from the lower part 706 of the aerodynamic body 302 over the leading edge 406 of the high lift gapped aileron 306 via the slot 528 when the high lift gapped aileron 306 is deflected with the trailing edge 410 (FIG. 4) down.

Figure 8:
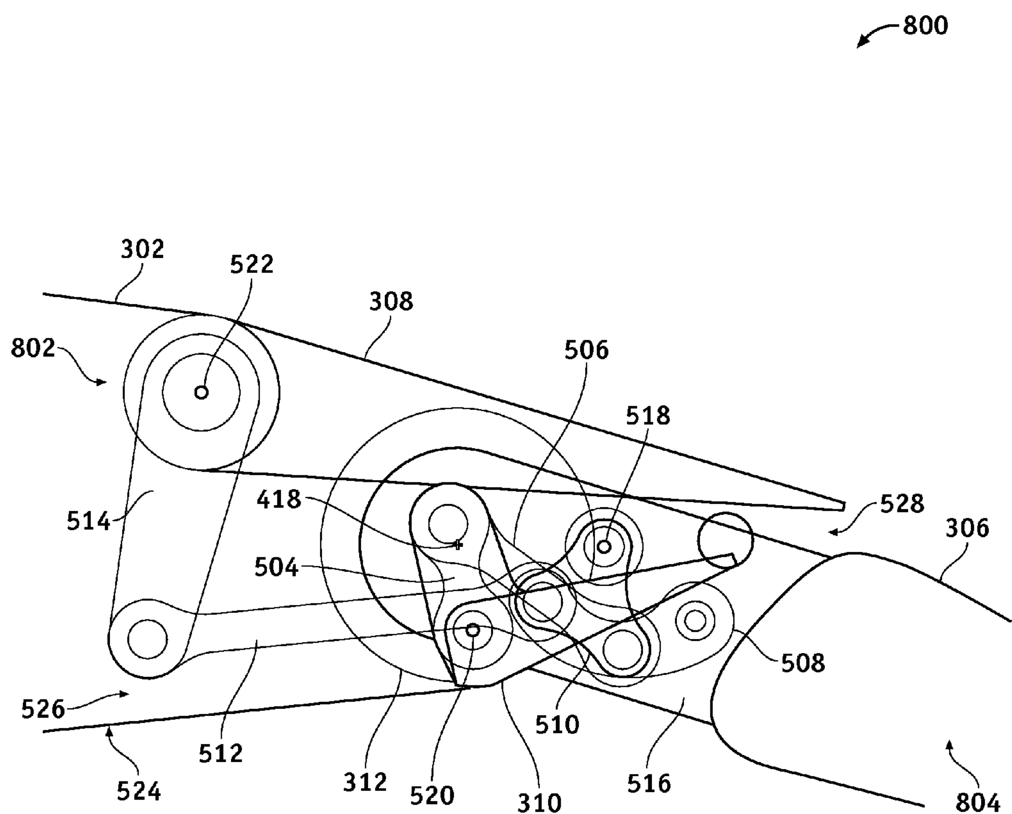
FIG. 8 is an illustration of an exemplary cross sectional view of a rotary actuated high lift gapped aileron system showing a deployment linkage mechanism in a take-off position according to an embodiment of the disclosure.

FIG. 8 is an illustration of an exemplary cross sectional view 800 of the rotary actuated high lift gapped aileron system 300 showing the deployment linkage mechanism 304 in a take-off configuration 802 with the high lift gapped aileron 306 in the take-off position 804 according to an embodiment of the disclosure. The assembly 320 (FIG. 3) may be positioned in an elevated position relative to the aerodynamic body 302 sufficient to increase the amount of lift generated, to reduce ground roll and the climb rate.

Figure 9:
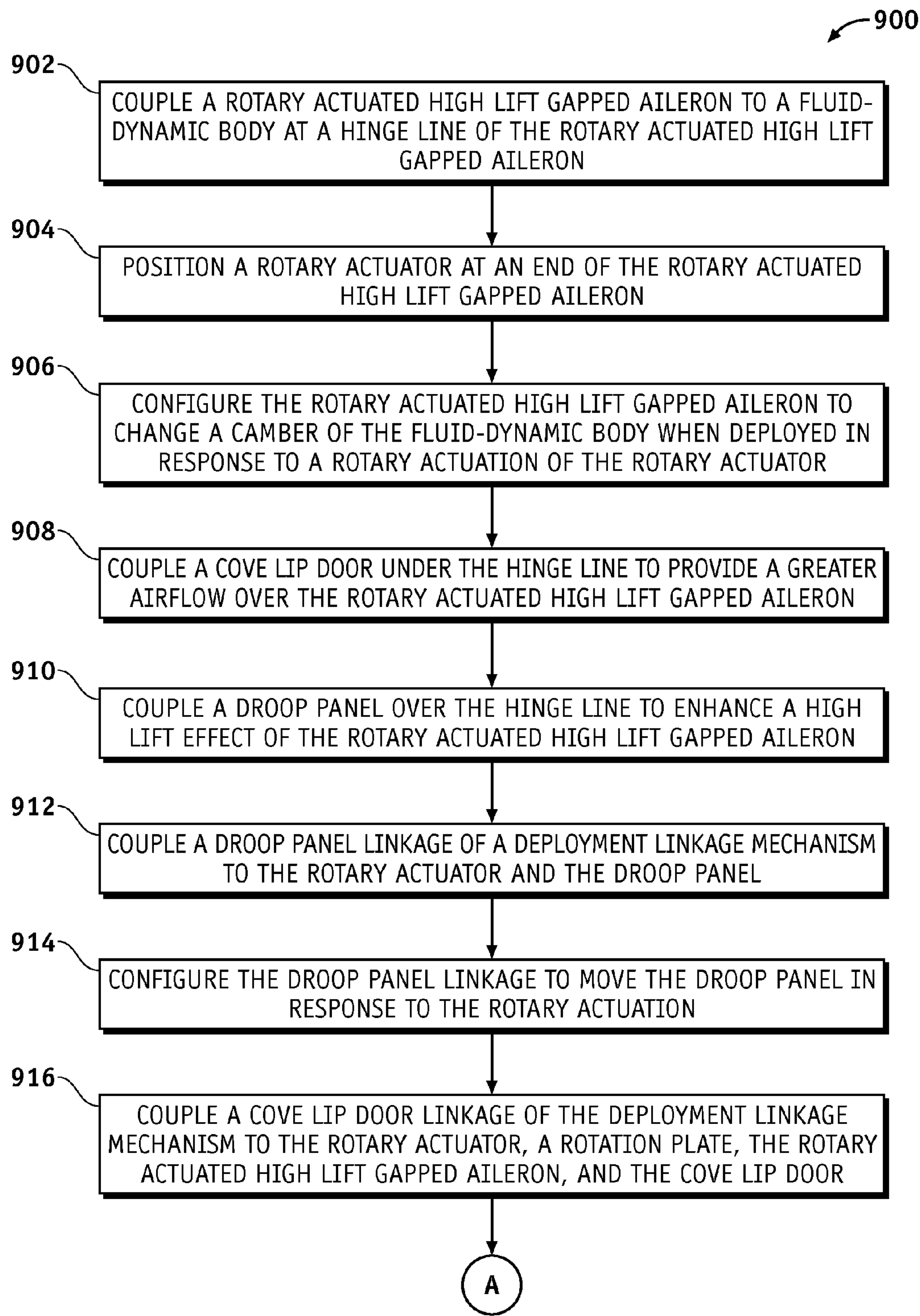
FIG. 9 is an illustration of an exemplary flowchart showing a process for providing a rotary actuated high lift gapped aileron system according to an embodiment of the disclosure.
Figure 9:
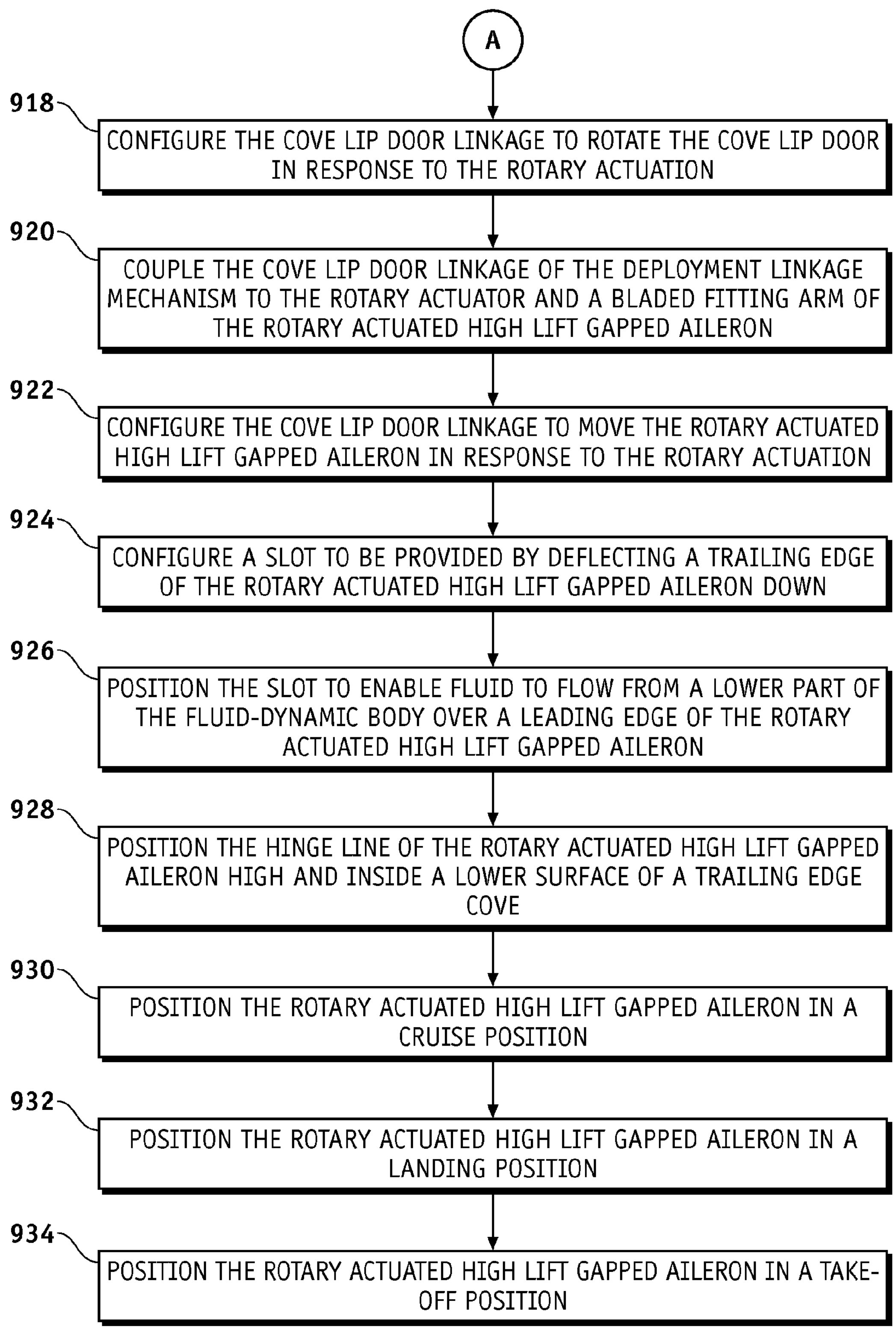

FIG. 9 is an illustration of an exemplary flowchart showing a process 900 for providing the rotary actuated high lift gapped aileron system 300 according to an embodiment of the disclosure. The various tasks performed in connection with process 900 may be performed mechanically, by software, hardware, firmware, computer-readable software, computer readable storage medium, or any combination thereof. It should be appreciated that process 900 may include any number of additional or alternative tasks, the tasks shown in FIG. 9 need not be performed in the illustrated order, and the process 900 may be incorporated into a more comprehensive procedure or process having additional functionality not described in detail herein.

For illustrative purposes, the following description of process 900 may refer to elements mentioned above in connection with FIGS. 1-8. In practical embodiments, portions of the process 900 may be performed by different elements of the system 300 such as: the fluid-dynamic body 302, the deployment linkage mechanism 304, the high lift gapped aileron 306, the droop panel 308, the cove lip door 310, the rotary actuator 312, the controller 314, etc. It should be appreciated that process 900 may include any number of additional or alternative tasks, the tasks shown in FIG. 9 need not be performed in the illustrated order, and the process 900 may be incorporated into a more comprehensive procedure or process having additional functionality not described in detail herein.

Process 900 may begin by coupling a rotary actuated high lift gapped aileron such as the rotary actuated high lift gapped aileron 306 to a fluid-dynamic body such as the fluid-dynamic body 302 at a high hinge line such as the high hinge line 418 of the rotary actuated high lift gapped aileron 306 (task 902).

Process 900 may continue by positioning a rotary actuator such as the rotary actuator 312 at an end such as the end area 420 of the rotary actuated high lift gapped aileron 306 (task 904).

Process 900 may continue by configuring the rotary actuated high lift gapped aileron 306 to change a camber such as the camber 416 of the fluid-dynamic body 302 when deployed in response to a rotary actuation of the rotary actuator 312 (task 906). Changing the camber 416 changes a lift coefficient of the fluid-dynamic body 302 which changes the lift produced by the fluid-dynamic body 302.

Process 900 may continue by coupling a cove lip door such as the cove lip door 310 under the high hinge line 418 to provide a greater airflow over the rotary actuated high lift gapped aileron 306 (task 908).

Process 900 may continue by coupling a droop panel such as the droop panel 308 over the high hinge line 418 to enhance a high lift effect of the rotary actuated high lift gapped aileron 306 (task 910).

Process 900 may continue by coupling a droop panel linkage such as the droop panel linkage 512 of a deployment linkage mechanism such the deployment linkage mechanism 304 to the rotary actuator 312 and the droop panel 308 (task 912).

Process 900 may continue by configuring the droop panel linkage 512 to move the droop panel 308 in response to the rotary actuation (task 914).

Process 900 may continue by coupling a cove lip door linkage such as the cove lip door linkage 506 of the deployment linkage mechanism 304 to the rotary actuator 312, a rotation plate such as the rotation plate 510, the rotary actuated high lift gapped aileron 306, and the cove lip door 310 (task 916).

Process 900 may continue by configuring the cove lip door linkage 506 to rotate the cove lip door 310 in response to the rotary actuation (task 918).

Process 900 may continue by coupling the cove lip door linkage 506 of the deployment linkage mechanism 304 to the rotary actuator 312 and a bladed fitting arm such as the bladed fitting arm 516 of the rotary actuated high lift gapped aileron 306 (task 920).

Process 900 may continue by configuring the cove lip door linkage 506 to move the rotary actuated high lift gapped aileron 306 in response to the rotary actuation (task 922).

Process 900 may continue by configuring a slot such as the slot 528 to be provided by deflecting a trailing edge such as the trailing edge 410 of the rotary actuated high lift gapped aileron 306 down (task 924).

Process 900 may continue by positioning the slot 528 to enable fluid such as the fluid stream 708 to flow from a lower part such as the lower part 706 of the fluid-dynamic body 302 over a leading edge such as the leading edge 406 of the rotary actuated high lift gapped aileron 306 (task 926).

Process 900 may continue by positioning a hinge line such as the high hinge line 418 of the rotary actuated high lift gapped aileron 306 high and inside a lower surface such as the lower surface 524 of a trailing edge cove such as the trailing edge cove 526 (task 928).

Process 900 may continue by positioning the rotary actuated high lift gapped aileron 306 in a cruise position such as the cruise position 604 (task 930).

Process 900 may continue by positioning the rotary actuated high lift gapped aileron 306 in a landing position such as the landing position 704 (task 932).

Process 900 may continue by positioning the rotary actuated high lift gapped aileron 306 in a take-off position such as the take-off position 804 (task 934).

In this manner, embodiments of the discloser provide high lift functionality to a gapped aileron, thereby reducing outboard flap span and simplifying the flap as well as reducing the number of spoilers by virtue of using a rotary actuator, rotary actuator placement, and bladed fitting geometry of the aileron.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-8 depict example arrangements of elements, additional intervening elements, devices, features, or components may be present in an embodiment of the disclosure.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 316 to cause the processor module 316 to perform specified operations. Such instructions, generally referred to as "computer program code" or "program code" (which may be grouped in the form of computer programs or other groupings), when executed, enable the system 300.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A rotary actuated high lift gapped aileron system, comprising:

a high lift gapped aileron coupled to an airfoil at a hinge line;

a rotary actuator coupled to the high lift gapped aileron at the hinge line, the rotary actuator operable to produce a rotary motion to rotate the high lift gapped aileron about the hinge line in response to an actuation command;

a droop panel positioned over the hinge line;

a cove lip door positioned under the hinge line; and a deployment linkage mechanism coupled to the high lift gapped aileron and operable to position the droop panel and the cove lip door in response to the rotary motion.

2. The system of claim 1, wherein the hinge line of the high lift gapped aileron is located high and inside a lower surface of a trailing edge cove.

3. The system of claim 1, wherein the high lift gapped aileron comprises at least one bladed fitting arm coupling the high lift gapped aileron to the rotary actuator, the at least one bladed fitting arm rigidly coupled to a leading edge of the high lift gapped aileron.

4. The system of claim 1, wherein the high lift gapped aileron is rotatable downward to provide a slot enabling fluid to flow from a lower part of the airfoil over a leading edge of the high lift gapped aileron via the slot.

5. The system of claim 1, wherein the airfoil comprises a wing of an aircraft.

6. The system of claim 1, wherein the cove lip door is configured to rotate in its entirety within a slot between the high lift gapped aileron and the airfoil.

7. A method for providing lift on a fluid-dynamic body, the method comprising:

coupling a rotary actuated high lift gapped aileron to a fluid-dynamic body at a hinge line of the rotary actuated high lift gapped aileron;

coupling a rotary actuator to the rotary actuated high lift gapped aileron at the hinge line of the rotary actuated high lift gapped aileron; and configuring the rotary actuated high lift gapped aileron to change a camber of the fluid-dynamic body when deployed in response to a rotary actuation of the rotary actuator; and coupling a cove lip door under the hinge line to provide a greater airflow over the rotary actuated high lift gap aileron.

8. The method of claim 7, further comprising:

coupling a droop panel over the hinge line to enhance a high lift effect of the rotary actuated high lift gapped aileron.

9. The method of claim 8, further comprising:

coupling a droop panel linkage of a deployment linkage mechanism to the rotary actuator and the droop panel;

configuring the droop panel linkage to move the droop panel in response to the rotary actuation;

coupling a cove lip door linkage of the deployment linkage mechanism to the rotary actuator, a rotation plate, the rotary actuated high lift gapped aileron, and the cove lip door;

configuring the cove lip door linkage to rotate the cove lip door in response to the rotary actuation;

coupling the cove lip door linkage of the deployment linkage mechanism to the rotary actuator and a bladed fitting arm of the rotary actuated high lift gapped aileron; and configuring the cove lip door linkage to move the rotary actuated high lift gapped aileron in response to the rotary actuation.

10. The method of claim 7, further comprising:

configuring a slot to be provided by deflecting a trailing edge of the rotary actuated high lift gapped aileron down; and positioning the slot to enable fluid to flow from a lower part of the fluid-dynamic body over a leading edge of the rotary actuated high lift gapped aileron.

11. The method of claim 7, further comprising positioning the hinge line of the rotary actuated high lift gapped aileron high and inside a lower surface of a trailing edge cove.

12. The method of claim 7, wherein coupling the rotary actuator to the rotary actuated high lift gapped aileron at the hinge line of the rotary actuated high lift gapped aileron comprises coupling the rotary actuator to a first end of a bladed fitting arm rigidly coupled, at a second end opposite the first end, to a leading edge of the rotary actuated high lift gapped aileron.

13. A high lift system comprising:

an airfoil;

an upper movable surface pivotally coupled to the airfoil;

a lower movable surface pivotally coupled to the airfoil; and a gapped aileron coupled to the airfoil by a rotary actuator at a common hinge line, the common hinge line located between the upper and lower movable surfaces.

14. The high lift system of claim 13, wherein the gapped aileron comprises at least one bladed fitting arm coupling the gapped aileron to the rotary actuator.

15. The high lift system of claim 13, wherein:

the upper movable surface comprises a droop panel coupled to the rotary actuator;

the lower movable surface comprises a lip cove door coupled to the rotary actuator; and the cove lip door and the droop panel are pivotable in response to rotary motion of the actuator.

16. The high lift system of claim 15, further comprising a linkage mechanism configured to simultaneously operate the cove lip door, the droop panel, and the gapped aileron in response to rotary motion of the actuator.

17. The high lift system of claim 15, further comprising:

a cove lip door linkage coupled to the gapped aileron and the cove lip door and operable to rotate the cove lip door in response to the rotary motion of the actuator; and a droop panel linkage coupled to the gapped aileron and the droop panel and operable to rotate the droop panel in response to the rotary motion of the actuator.

18. The high lift system of claim 15, wherein the cove lip door is configured to move upward when the gapped aileron is deflected downward such that a slot is defined upstream of a leading edge of the gapped aileron.

19. The high lift system of claim 15, wherein the cove lip door and the droop panel are arranged such that:

trailing edges of the cove lip door and the droop panel are spaced apart a first distance when the gapped aileron is in an upward deflected position; and the trailing edges of the cove lip door and the droop panel are spaced apart a second distance smaller than the first distance when the gapped aileron is in a downward deflected position.

20. The high lift system of claim 13, wherein:

an aircraft comprises the high lift system; and the airfoil is a wing of the aircraft.

* * * * *